March 3, 1959  D. R. FRY  2,876,410
RECHARGEABLE BATTERY CAPSULE
Filed May 31, 1957
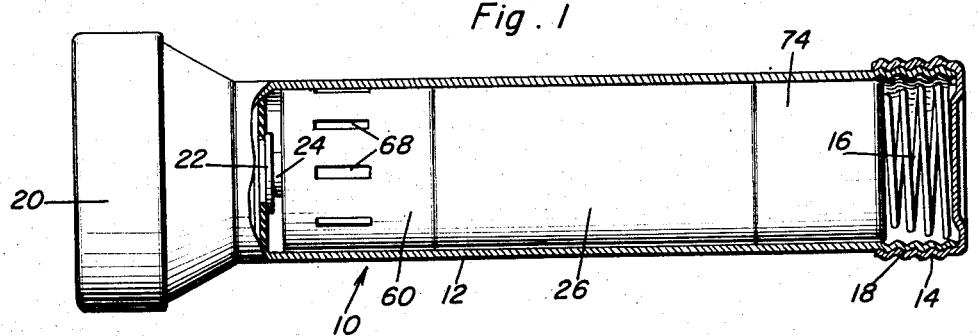
Fig. 1
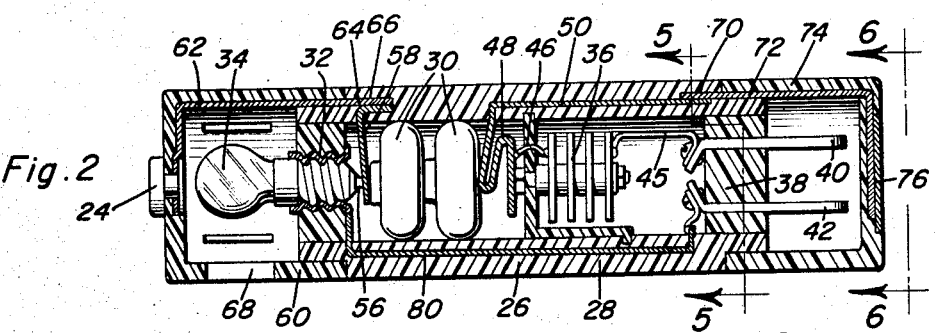
Fig. 2
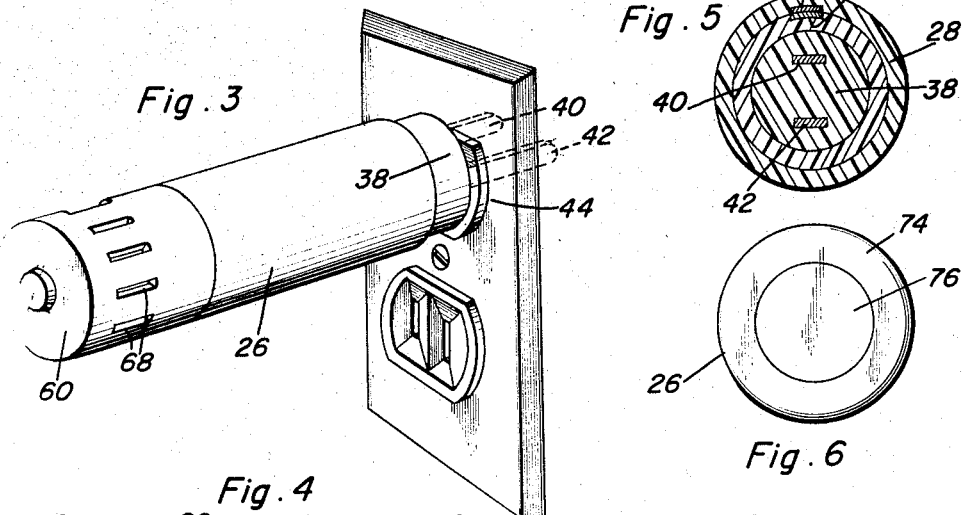
Fig. 3
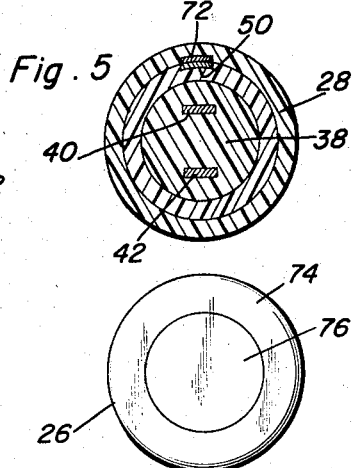
Fig. 5
Fig. 6
Fig. 4
Donald R. Fry
INVENTOR.
BY
Attorneys United States Patent Office 2,876,410
Patented Mar. 3, 1959

2,876,410

RECHARGEABLE BATTERY CAPSULE

Donald R. Fry, East Greenbush, N. Y.

Application May 31, 1957, Serial No. 662,920

6 Claims. (Cl. 320—48)

This invention relates to a rechargeable battery capsule and more particularly to a self contained capsule for insertion in a conventional flashlight case in lieu of regular batteries and which may be removed from the case for recharging and for further use.

The primary object of the present invention resides in the provision of a rechargeable self contained capsule for use in flashlights of conventional construction in lieu of the batteries thereof which may be readily recharged and reused.

Dry cell batteries often grow stale and discharge during periods of non-use. Further, once the dry cell batteries have been discharged they are no longer usable. Thus, the user of a flashlight must have replacement dry cell batteries and in view of the limited shelf life of dry cell batteries, it is undesirable to purchase substitute batteries and maintain them in readiness pending the discharge of the batteries in a flashlight. Thus, when it is necessary to use a flashlight, the flashlight is oftentimes inoperable due to the unsatisfactory condition of the dry cell batteries. The present invention provides means for recharging a battery capsule which can be utilized in lieu of the conventional dry cell batteries and which may be easily inserted into a conventional electrical outlet so as to charge the batteries whether the charging current is of alternating or direct current.

The construction of this invention features the utilization of hermetically sealed nickel-cadmium battery cells which have almost unlimited life provided they are properly charged and recharged. Further, incorporated in the invention is a suitable rectifier which insures against improper charging of the batteries and allows the batteries to be charged utilizing alternating current. Further, the prongs are enclosed by an end piece carrying a contact plate engageable by the end cap of the flashlight case. Also, a button contact is utilized for engagement by the lamp of the flashlight which button contact is mounted on a cap of the rechargeable capsule.

Still further objects and features of this invention reside in the provision of a self contained rechargeable capsule which is simple in construction, easy to utilize, and which is substantially fool-proof and safe in operation.

These, together with the various ancillary objects and features of the invention which will become apparent as the following description proceeds, are attained by this rechargeable battery capsule, a preferred embodiment of which has been illustrated in the accompanying drawings, by way of example only, wherein:

Figure 1 is an elevational view of a flashlight constructed in accordance with the concepts of the present invention and employing a rechargeable battery capsule with a portion of the case of the flashlight being broken away to show the position of the rechargeable battery capsule within the flashlight case;

Figure 2 is an enlarged longitudinal sectional detail view of the rechargeable battery capsule;

Figure 3 is a perspective view of the rechargeable battery capsule as shown inserted into an electrical outlet with the end piece removed;

Figure 4 is a schematic wiring diagram of the electrical circuits employed in the invention;

Figure 5 is a sectional detail view as taken along the planes of line 5—5 in Figure 2; and Figure 6 is an end elevational view of the rechargeable battery capsule.

With continuing reference to the accompanying drawings, wherein like reference numerals designate similar parts throughout the various views, reference numeral 10 generally designates a flashlight constructed in accordance with the concepts of the present invention. This flashlight includes a conventional flashlight casing 12 having a removable end cap 14 provided with a spring conductor 16 threadedly engaged on the threaded end 18 of the case 12. Further, the flashlight case 12 includes a removable cap 20 holding the lens, reflector, and lamp assembly in position. The flashlight is provided with a contact 22 for engaging the button contact on a flashlight battery or for engaging the button contact 24 on the rechargeable battery capsule 26 which comprises the present invention.

The rechargeable battery capsule 26 includes a body 28 of an electrically insulative material having hermetically sealed nickel-cadmium cells 30 of a desired number therein and also carrying a lamp socket 32 having a lamp 34 detachably secured thereto. The lamp 34 may vary in its size and capacity in view of the source of electrical power to be used in recharging the batteries 30. Also mounted within the body 28 is a rectifier 36 such as a selenium rectifier or the like. The body 28 has a relatively thick end portion 38 through which prongs 40 and 42 extend. The prongs being adapted to fit into the conventional wall outlet as at 44 or the like. The prong 40 is connected through conductor 45 to the rectifier 36, the rectifier 36 being connected through a conductor 46 to the conductive strip 48 which engages the battery cells 30 and which has a portion as at 50 embedded in the body 28. The lamp 34 has its end contact 56 engageable with a contact 58 which engages the battery cells 30. The contact 58 is partially embedded in the body 28.

Detachably secured to the body 28 is a cap 60 having a conductor 62 partially embedded therein and having an end portion 64 extending beyond the cap 60 to seat in the recess 66 in the body 28 which recess communicates with the contact 58. Electrically connected to the conductor 62 is the button contact 24. Hence, when the cap 60 is in place, an operative electrical circuit from the battery to the button contact 24 is achieved. A plurality of spaced slots 68 are formed in the cap 60. This allows observation of the light rays emanating from the lamp 34 to show that the rechargeable battery capsule is being recharged when in the position shown in Figure 3. The body is provided with a hollow as at 70 therein communicating with the conductive strip 50 in such manner that the contact strip 72 embedded in the end piece 74 can be inserted into the recess 70 and into contact and electrical engagement with the conductive strip 50. The end piece 74 is in the form of a cylindrical cap and is detachably secured to the body 28. The end piece 74 encloses the prongs 40 and 42 and includes a contact plate 76 which is electrically connected to the contact strip 72. When the spring 16 engages the contact plate 76, the case 12 will of course be grounded for completing the operative electric circuit in the flashlight case as is conventional. The circuit would then be through the contact plate 76 and the contact strip 72, through the conductor strip 50 to the battery cells 30 and thence through the contact 58 and the conductor 62 to the button contact 24.

Alternatively, when it is desired to recharge the battery cells 30, the electrical circuit is through prong 40 and conductor 45 through the rectifier 36, conductor 46 and conductor strip 48 to the battery cells 50 thence through contact 56 to the lamp 34. From the lamp 34, and lamp socket 32, an electrical conductor 80 is connected to the prong 42.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A self contained rechargeable capsule for insertion in a flashlight case comprising an electrically insulative body having nickel-cadmium battery cells therein and having a rectifier mounted therein, prongs extending outwardly of said body, one of said prongs being electrically connected to said rectifier, said rectifier being electrically connected to said battery cells, a lamp socket in said body having a lamp therein, said lamp being electrically connected to said battery cells, said lamp socket being electrically connected to the other of said prongs, a contact connected to said battery cells embedded in said body, said body having a recess therein communicating with said contact, a cap removably secured to said body and having a conductor extending outwardly of said cap into said recess and into engagement with said contact, and a button contact on said cap, said conductor being connected to said button contact.

2. A self contained rechargeable capsule for insertion in a flashlight case comprising an electrically insulative body having nickel-cadmium battery cells therein and having a rectifier mounted therein, prongs extending outwardly of said body, one of said prongs being electrically connected to said rectifier, said rectifier being electrically connected to said battery cells, a lamp socket in said body having a lamp therein, said lamp being electrically connected to said battery cells, said lamp socket being electrically connected to the other of said prongs, a conductive strip connected to said battery cells and embedded in said body, said body having a hollow therein communicating with said conductive strip, an end piece removably secured to said body and having a contact strip extending outwardly of said end piece into said hollow and into communication with said conductive strip, and a contact plate on said end piece, said contact strip being connected to said button contact.

3. A self contained rechargeable capsule for insertion in a flashlight case comprising an electrically insulative body having nickel-cadmium battery cells therein and having a rectifier mounted therein, prongs extending outwardly of said body, one of said prongs being electrically connected to said rectifier, said rectifier being electrically connected to said battery cells, a lamp socket in said body having a lamp therein, said lamp being electrically connected to said battery cells, said lamp socket being electrically connected to the other of said prongs, a conductive strip connected to said battery cells and embedded in said body, said body having a hollow therein communicating with said conductive strip, an end piece removably secured to said body and having a contact strip extending outwardly of said end piece into said hollow and into communication with said conductive strip, a contact plate on said end piece, said contact strip being connected to said button contact, said end piece being of an electrically insulative material and enclosing said prongs.

4. A self contained rechargeable capsule for insertion in a flashlight case comprising an electrically insulative body having nickel-cadmium battery cells therein and having a rectifier mounted therein, prongs extending outwardly of said body, one of said prongs being electrically connected to said rectifier, said rectifier being electrically connected to said battery cells, a lamp socket in said body having a lamp therein, said lamp being electrically connected to said battery cells, said lamp socket being electrically connected to the other of said prongs, a contact connected to said battery cells embedded in said body, said body having a recess therein communicating with said contact, a cap removably secured to said body and having a conductor extending outwardly of said cap into said recess and into engagement with said contact, and a button contact on said cap, said conductor being connected to said button contact, a conductive strip connected to said battery cells and embedded in said body, said body having a hollow therein communicating with said conductive strip, an end piece removably secured to said body and having a contact strip extending outwardly of said end piece into said hollow and into communication with said conductive strip, and a contact plate on said end piece, said contact strip being connected to said button contact.

5. A self contained rechargeable capsule for insertion in a flashlight case comprising an electrically insulative body having nickel-cadmium battery cells therein and having a rectifier mounted therein, prongs extending outwardly of said body, one of said prongs being electrically connected to said rectifier, said rectifier being electrically connected to said battery cells, a lamp socket in said body having a lamp therein, said lamp being electrically connected to said battery cells, said lamp socket being electrically connected to the other of said prongs, a contact connected to said battery cells embedded in said body, said body having a recess therein communicating with said contact, a cap removably secured to said body and having a conductor extending outwardly of said cap into said recess and into engagement with said contact, and a button contact on said cap, said conductor being connected to said button contact, said cap being of an electrically insulative material and enclosing said lamp, said cap having a plurality of spaced slots therein.

6. A self contained rechargeable capsule for insertion in a flashlight case comprising an electrically insulative body having nickel-cadmium battery cells therein and having a rectifier mounted therein, prongs extending outwardly of said body, one of said prongs being electrically connected to said rectifier, said rectifier being electrically connected to said battery cells, a lamp socket in said body having a lamp therein, said lamp being electrically connected to said battery cells, said lamp socket being electrically connected to the other of said prongs, a contact connected to said battery cells embedded in said body, said body having a recess therein communicating with said contact, a cap removably secured to said body and having a conductor extending outwardly of said cap into said recess and into engagement with said contact, and a button contact on said cap, said conductor being connected to said button contact, a conductive strip connected to said battery cells and embedded in said body, said body having a hollow therein communicating with said conductive strip, an end piece removably secured to said body and having a contact strip extending outwardly of said end piece into said hollow and into communication with said conductive strip, and a contact plate on said end piece, said contact strip being connected to said button contact, said cap being of an electrically insulative material and enclosing said lamp, said cap having a plurality of spaced slots therein, said end piece being of an electrically insulative material and enclosing said prongs.

References Cited in the file of this patent

UNITED STATES PATENTS

| | | |
|---|---|---|
| 1,506,302 | Hopkins | Aug. 26, 1924 |
| 2,293,284 | Emanuel | Aug. 18, 1942 |
| 2,518,039 | Malki et al. | Aug. 8, 1950 |
| 2,628,339 | Werner | Feb. 10, 1953 |
| 2,642,520 | Coolidge et al. | June 16, 1953 |